United States Patent
Gjersvik et al.

(10) Patent No.: US 12,152,678 B2
(45) Date of Patent: Nov. 26, 2024

(54) BELLOW

(71) Applicant: Kaan Holding AS, Averøy (NO)

(72) Inventors: Roger Gjersvik, Averøy (NO); Geir Rugset, Averøy (NO)

(73) Assignee: KAAN Holding AS, Averoy (NO)

( * ) Notice: Subject to any disclaimer, the term of this patent is extended or adjusted under 35 U.S.C. 154(b) by 641 days.

(21) Appl. No.: 17/291,579

(22) PCT Filed: Oct. 4, 2019

(86) PCT No.: PCT/NO2019/050207
§ 371 (c)(1),
(2) Date: May 5, 2021

(87) PCT Pub. No.: WO2020/096459
PCT Pub. Date: May 14, 2020

(65) Prior Publication Data
US 2021/0396319 A1 Dec. 23, 2021

(30) Foreign Application Priority Data
Nov. 9, 2018 (NO) .................................... 20181441

(51) Int. Cl.
*F16J 15/52* (2006.01)
*F16J 3/04* (2006.01)

(52) U.S. Cl.
CPC ............... *F16J 15/52* (2013.01); *F16J 3/042* (2013.01); *F16J 3/045* (2013.01)

(58) Field of Classification Search
CPC .. F16J 3/045; F16J 15/52; F16D 3/845; F16L 5/025; F16L 5/04; F16L 5/10; Y10T 403/31
See application file for complete search history.

(56) References Cited

U.S. PATENT DOCUMENTS 2,708,123 A * 5/1955 Risley ..................... F16L 58/18
174/DIG. 11
3,279,834 A * 10/1966 Budzynski .......... F16C 11/0671
277/390

(Continued)

FOREIGN PATENT DOCUMENTS

CN 106195265 A 12/2016
DE 706519 C 5/1941

(Continued)

OTHER PUBLICATIONS

International Preliminary Report on Patentability dated May 11, 2021 for International Patent Application No. PCT/NO2019/050207.

(Continued)

*Primary Examiner* — Kristina R Fulton
*Assistant Examiner* — Thomas L Neubauer
(74) *Attorney, Agent, or Firm* — Alix, Yale & Ristas, LLP

(57) ABSTRACT

Bellow of a flexible material for protecting a coupling comprising first and second connector end subject to vibration and torsion. The bellow comprises a material able to prevent material from entering or exiting the space between the connector ends. The bellow is arranged to be attached to the first connector end by a first clamp and to the second connector end by a second clamp. The bellow is provided with a zipper comprising a zipper slider and first and second zipper part attached to opposite ends of the sheet. Thus, the bellow can be wrapped around said first connector end and second connector end and closed by zipper.

14 Claims, 11 Drawing Sheets

(56) References Cited

U.S. PATENT DOCUMENTS

| | | | |
|---|---|---|---|
| 3,638,503 | A | 2/1972 | Stipanovic et al. |
| 4,813,913 | A | 3/1989 | Belter |
| 5,182,956 | A * | 2/1993 | Woodall .................. F16J 3/045 |
| | | | 277/630 |
| 5,222,746 | A | 6/1993 | Van Steenbrugge |
| 5,661,230 | A | 8/1997 | Morrison |
| 6,139,027 | A | 10/2000 | Biekx |
| 6,421,886 | B1 | 7/2002 | Detiker |
| 6,764,243 | B1 | 7/2004 | Inuzuka et al. |
| 8,840,977 | B2 * | 9/2014 | Tailor .................... F16L 13/004 |
| | | | 285/21.2 |
| 2007/0142116 | A1 | 6/2007 | Nakamura |
| 2017/0009815 | A1 | 1/2017 | Innocenzi et al. |

FOREIGN PATENT DOCUMENTS

| | | |
|---|---|---|
| DE | 3309940 C1 | 4/1984 |
| DE | 10355213 A1 | 6/2005 |
| GB | 2196396 A | 4/1988 |
| JP | 10184913 A | 7/1998 |
| JP | 3476004 B2 | 12/2003 |
| JP | 2004156643 A | 6/2004 |
| RU | 2610321 C1 | 2/2017 |

OTHER PUBLICATIONS

International Search Report and Written Opinion dated Dec. 13, 2019 for International Patent Application No. PCT/NO2019/050207.

* cited by examiner

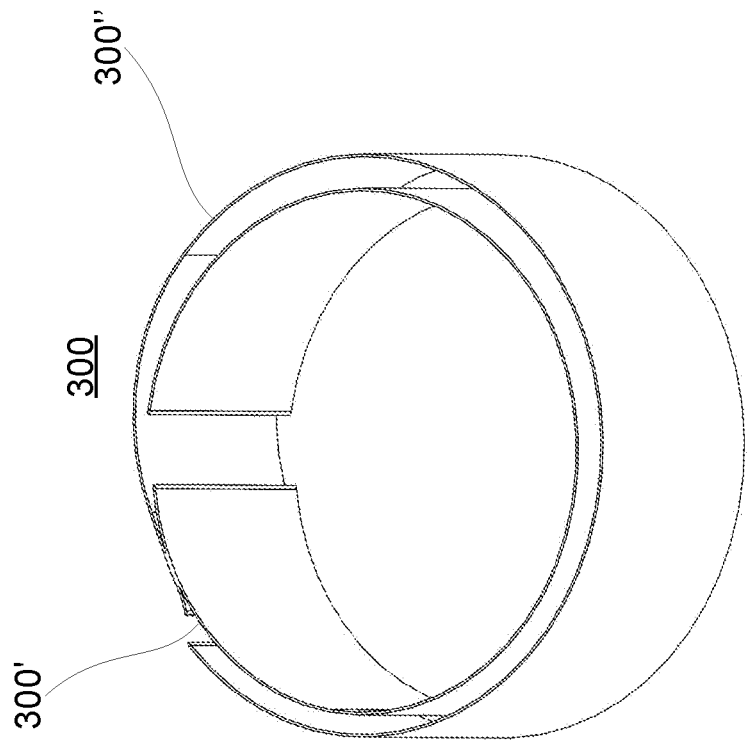
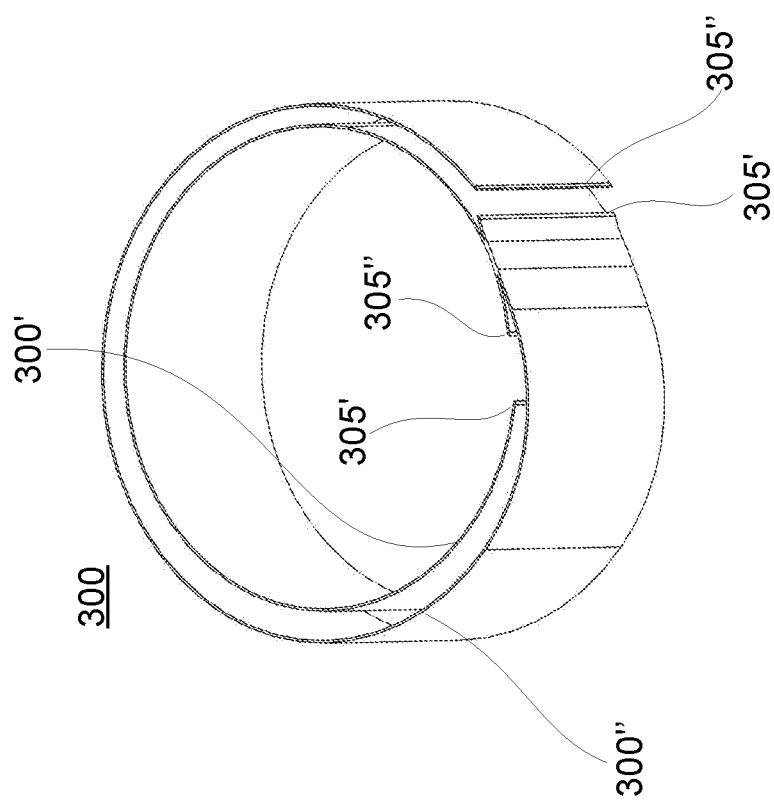
Fig. 3A
Fig. 3B

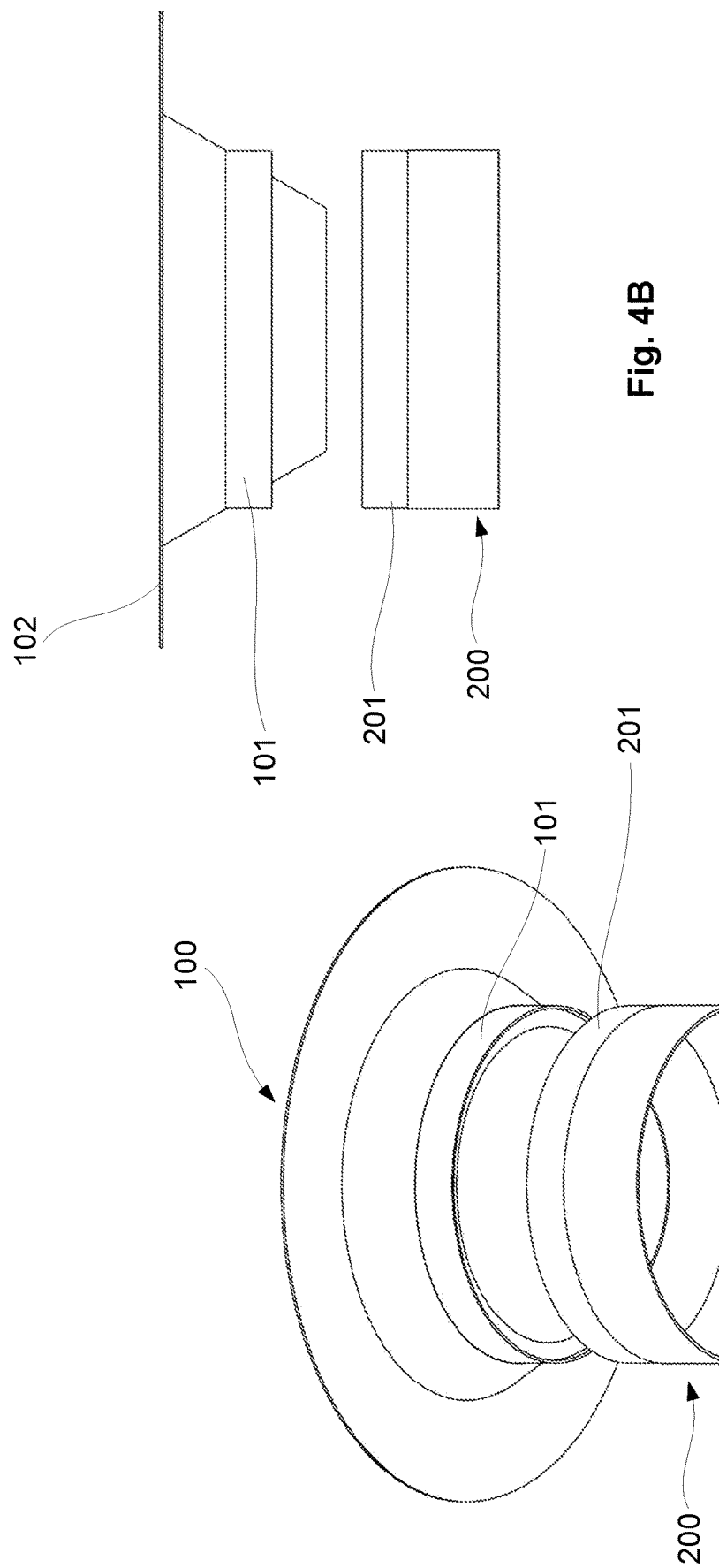

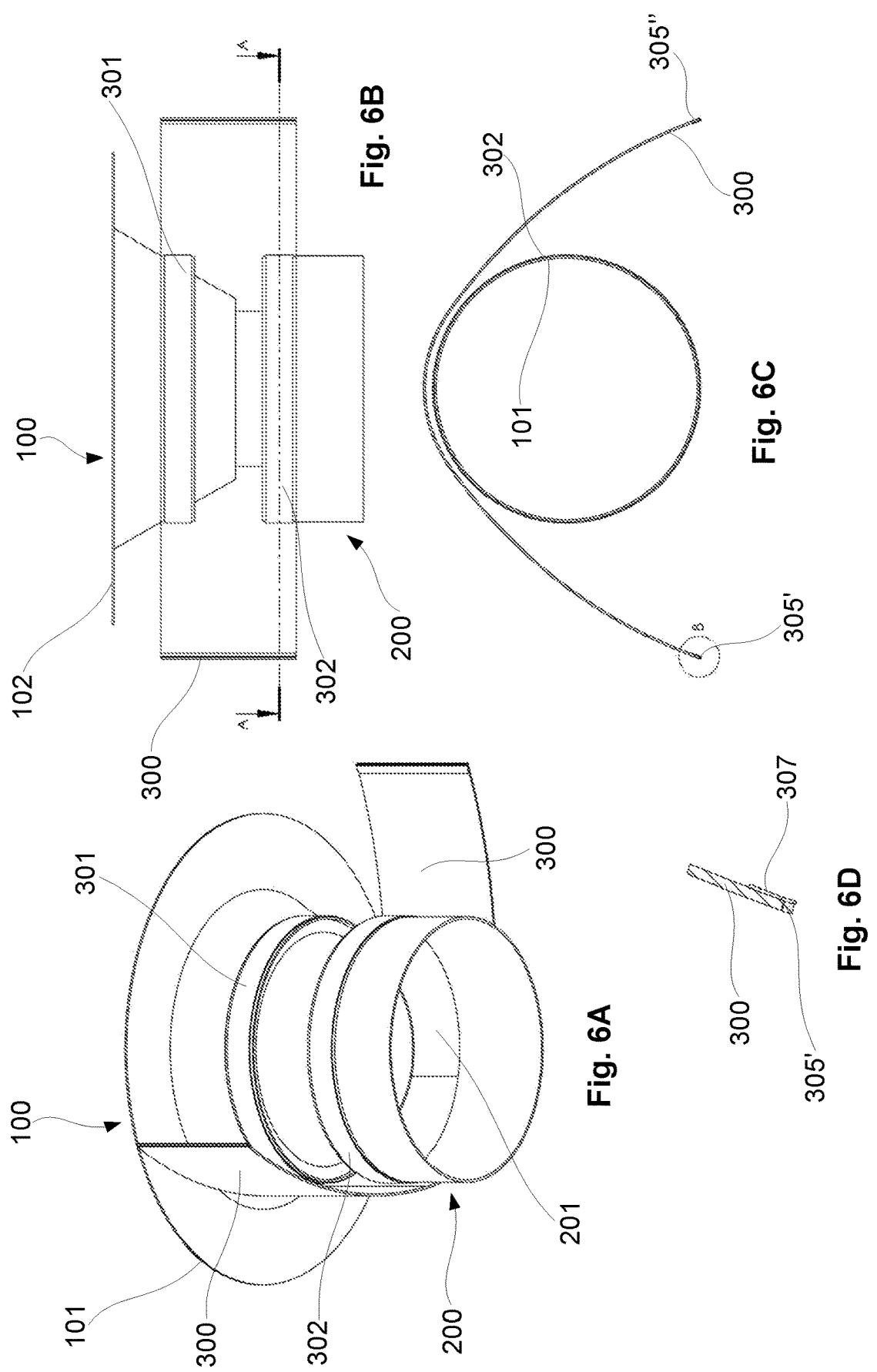

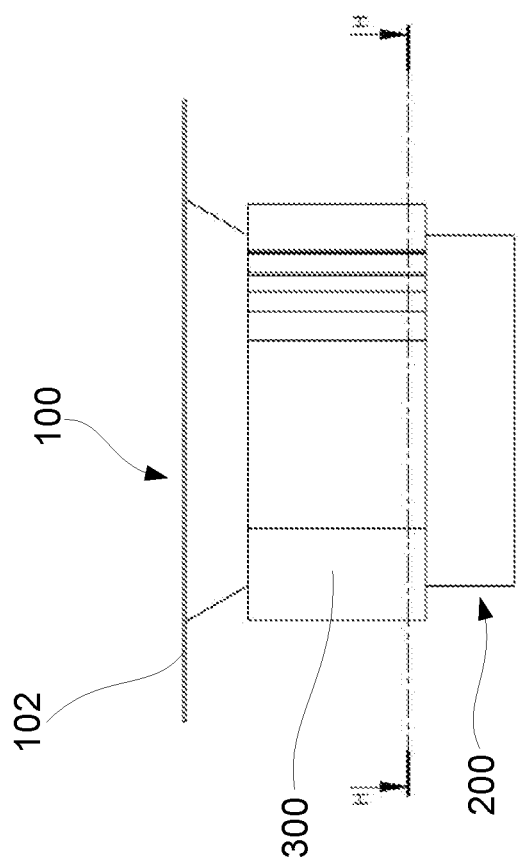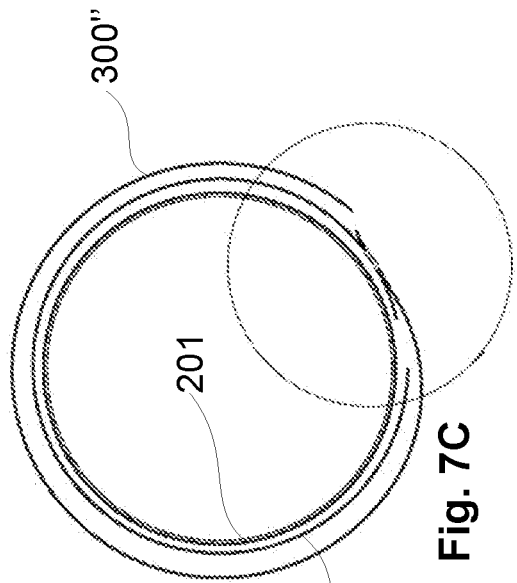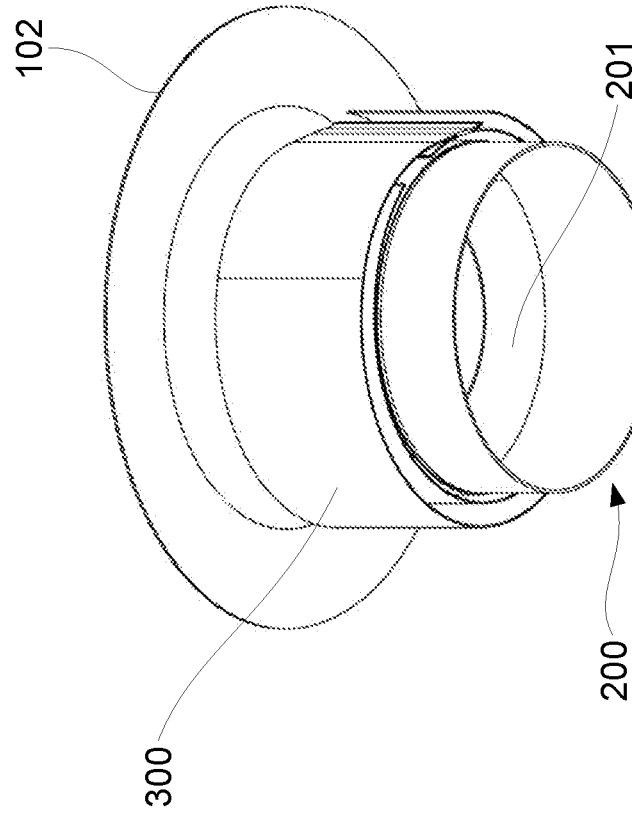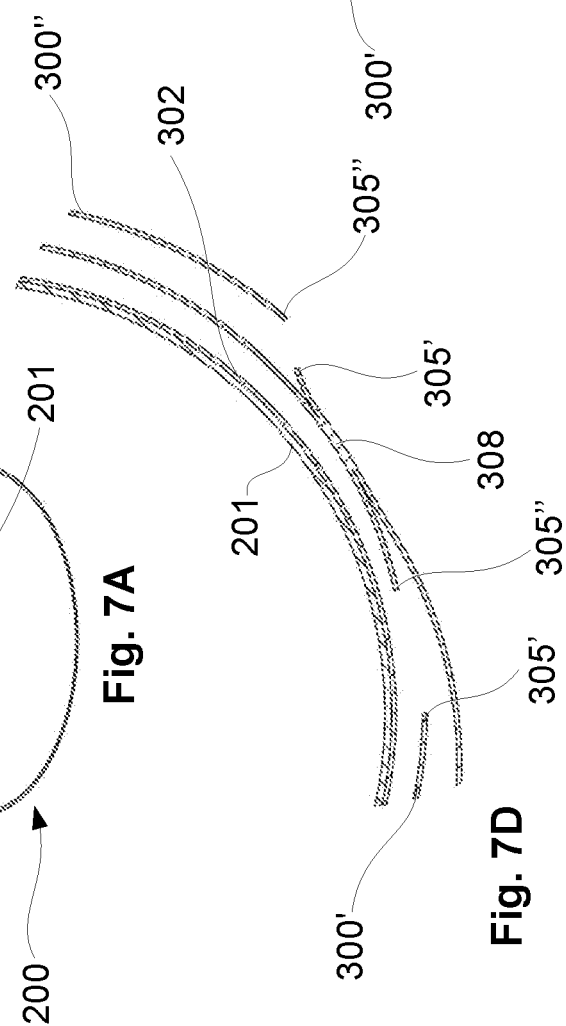

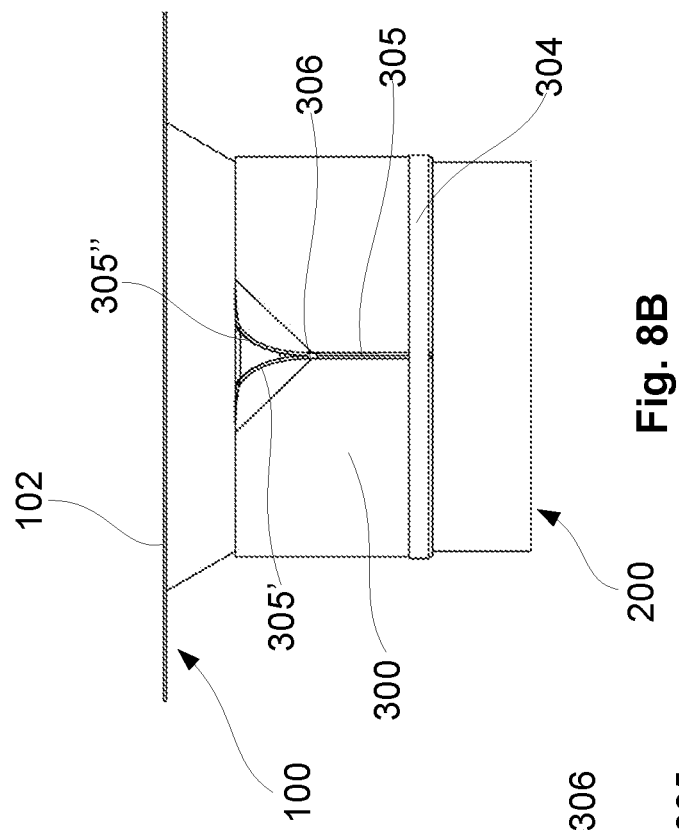
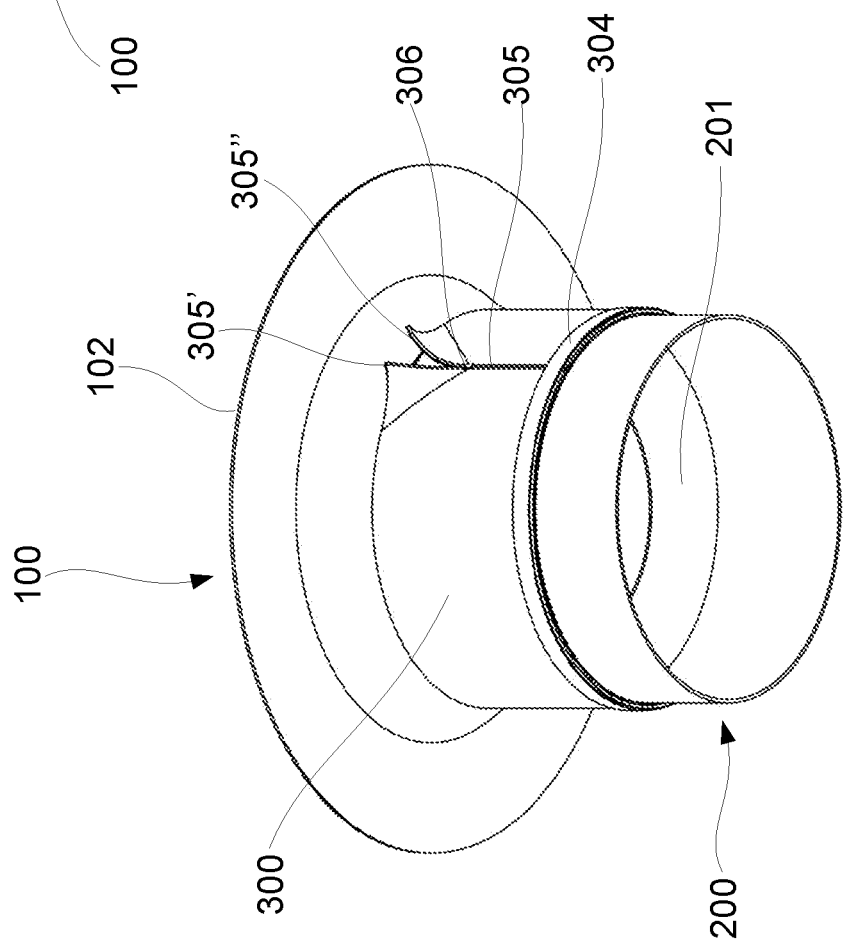

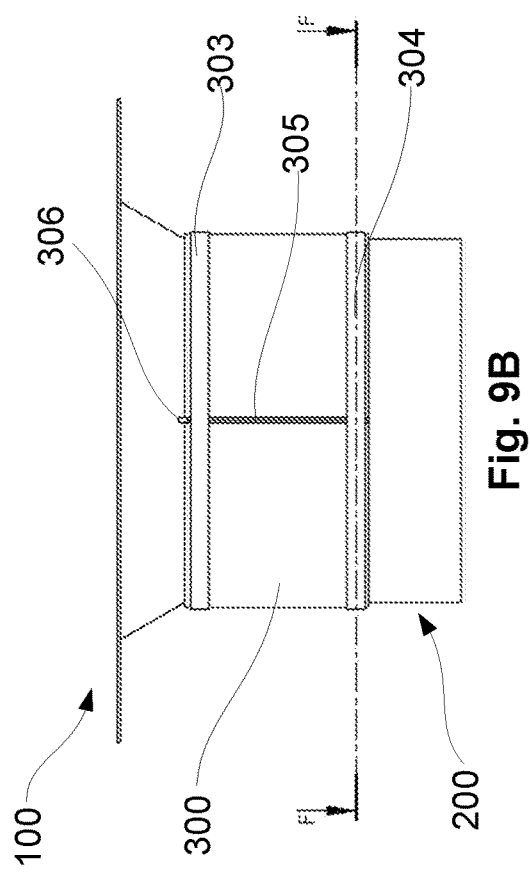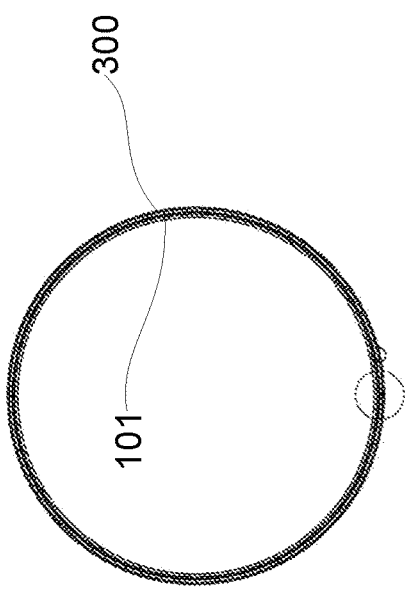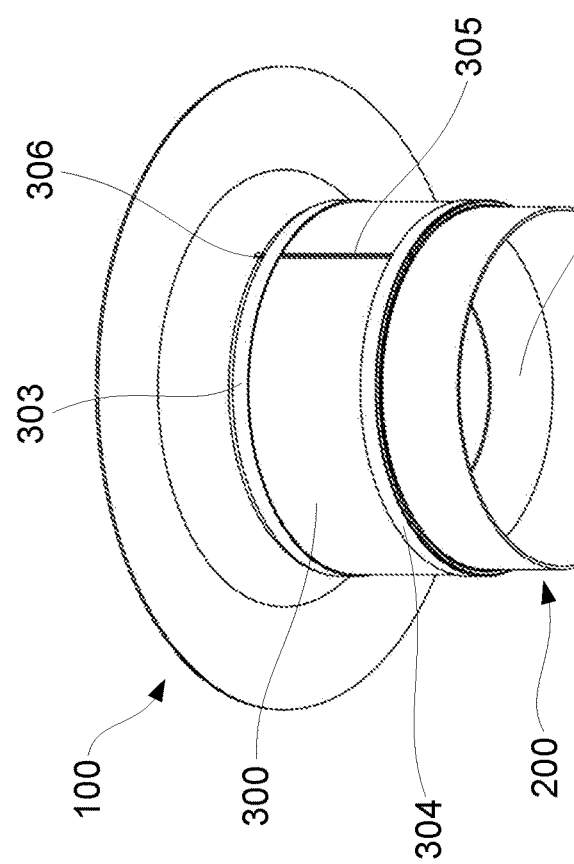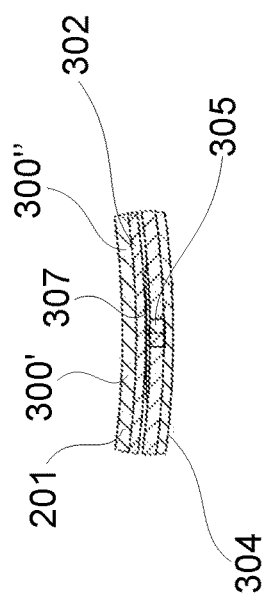

BELLOW

BACKGROUND

The disclosed embodiments relate to a bellow for preventing foreign matter from entering the operating part of a coupling, such as universal joints, guiding axle couplings, guiding axle couplings and hopper connections. Bellows for couplings of this types are also used for safety reasons to protect personell injury.

There are numerous examples of bellows from the prior art. EP 1 101 982 describes a boot for sealing an operating coupling, such as a universal joint. The boot comprises a corrugated body of a flexible material. U.S. Pat. No. 5,222,746 describes protective bellows for universal joints allowing rapid installation. WO 99/39123 describes an arrangement for connecting the edges of a strip of a locking or compression ring that enables enhanced tensile load. JP2004156643 describes a boot for a universal joint. Yet other examples are US 2007142116, JP20867899, U.S. Pat. No. 3,638,503, JPH10184913 og RU2610321C1.

However, a disadvantage of prior art couplings is that complete axles, couplings and similar must be dismantled in order to replace a defect bellow or perform service operations on the coupling. This is an operation that may take hours to perform.

A bellow is described in DE 706 519 C, arranged to be attached to the ends of separate adjacent rotating axles. The bellow is made of rubber and is provided with a zipper to shorten the time needed to replace a bellow.

SUMMARY

It would therefore be useful to provide a simplified bellow that can be replaced from a coupling in a simple manner and in a substantial short period of time compared to prior art coupling bellows. It would also be useful to provide a bellow that can be adapted to a wide range of uses.

The disclosed embodiments concern a bellow comprising a flexible, at least partially dustproof or fluidproof, material, e.g. a polymer, an elastomer or a textile material, for protecting space between a first connector end of a first connector, and a second connector end of a second connector in a coupling. In use, the first and second connectors are being subjected to relative translation and vibration. The bellow can be attached to the first connector end by a first clamp and to the second connector end by a second clamp. The bellow further comprises at least one sheet provided with a zipper comprising a zipper slider and first and second zipper part attached to opposite ends of the sheet, wherein the zipper is arranged to close or open the bellow when wrapped around said first and second connector ends.

In one embodiment, the bellow comprises a first bellow section and a second bellow section, arranged to be wrapped around said first connector end and second connector end and closed by zipper, with the second bellow section applied upon the first bellow section.

In another embodiment, the first bellow section and the second bellow section are interconnected by a bellow section connection at the end of the bellow sections near the adjacent ends of the first bellow section and second bellow section.

Moreover, the bellow section connection can be a moulded connection or a glued connection.

The bellow does in one embodiment exhibit a convex surface configuration when wrapped and secured around the first and second connector ends. In another embodiment the bellow exhibits a cylindrical surface configuration when wrapped and secured around the first and second connector ends. In yet another embodiment the bellow exhibits a frustoconical surface configuration when wrapped and secured around the first and second connector ends.

The bellow comprises a first and second connector annular sealing of a flexible material, arranged to be applied on said first and second connector end, respectively, underneath the bellow when wrapped around said first and second connector end.

Moreover, the bellow sheet exhibits excessive material providing a bellow length, measured along the longitudinal axis of the bellow in an assembled position, which is longer than the distance between the first and second connector ends, thus leaving a region of the bellow ends without zipper. Moreover, the zipper and zipper support exhibit a thickness in a direction perpendicular to the bellow sheet plane that is substantially the same as the thickness of the radial thickness of the connector sealings, thus enabling the end of said zipper and zipper support to be arranged flush with the respective adjacent connector sealings. This arrangement makes the connection even more dust or fluid proof.

In order to increase dust or fluid proofing, a sealant can be applied in the interstice between the first and second bellow sections, such as a viscous sealant, e.g. grease.

It should be mentioned that while most bellows of this type are applied to prevent fluid, dust or other foreign substances from entering the space between the connector ends, the disclosed bellow is also applicable to joints transporting powdery or fluid, with the aim of preventing the material inside from exiting the joint.

Accordingly, the bellow can be applied to a joint in a fraction of a time as compared to prior art bellows of this type. Moreover, the operation does not need any gluing step.

BRIEF DESCRIPTION OF THE DRAWINGS

The invention is described in further detail below by means of drawings, where

FIGS. 3A and 3B are drawings of one embodiment of the bellow in perspective, FIGS. 4A and 4B are drawings of the respective pipe end sections, FIGS. 6A to 6C are drawings illustrating a bellow during installation, FIG. 6D is a drawing showing a cross-section through the zipper section of the bellow, FIGS. 7A to 7C are drawings similar to FIGS. 6A-C just before the zipper closing step, FIGS. 8A and 8B are perspective and side views of the bellow just before the zipper closing step is completed, FIGS. 9A to 9D are drawings similar to FIGS. 7A to 7D with the bellow in an installed position.

DETAILED DESCRIPTION

Figure 1:
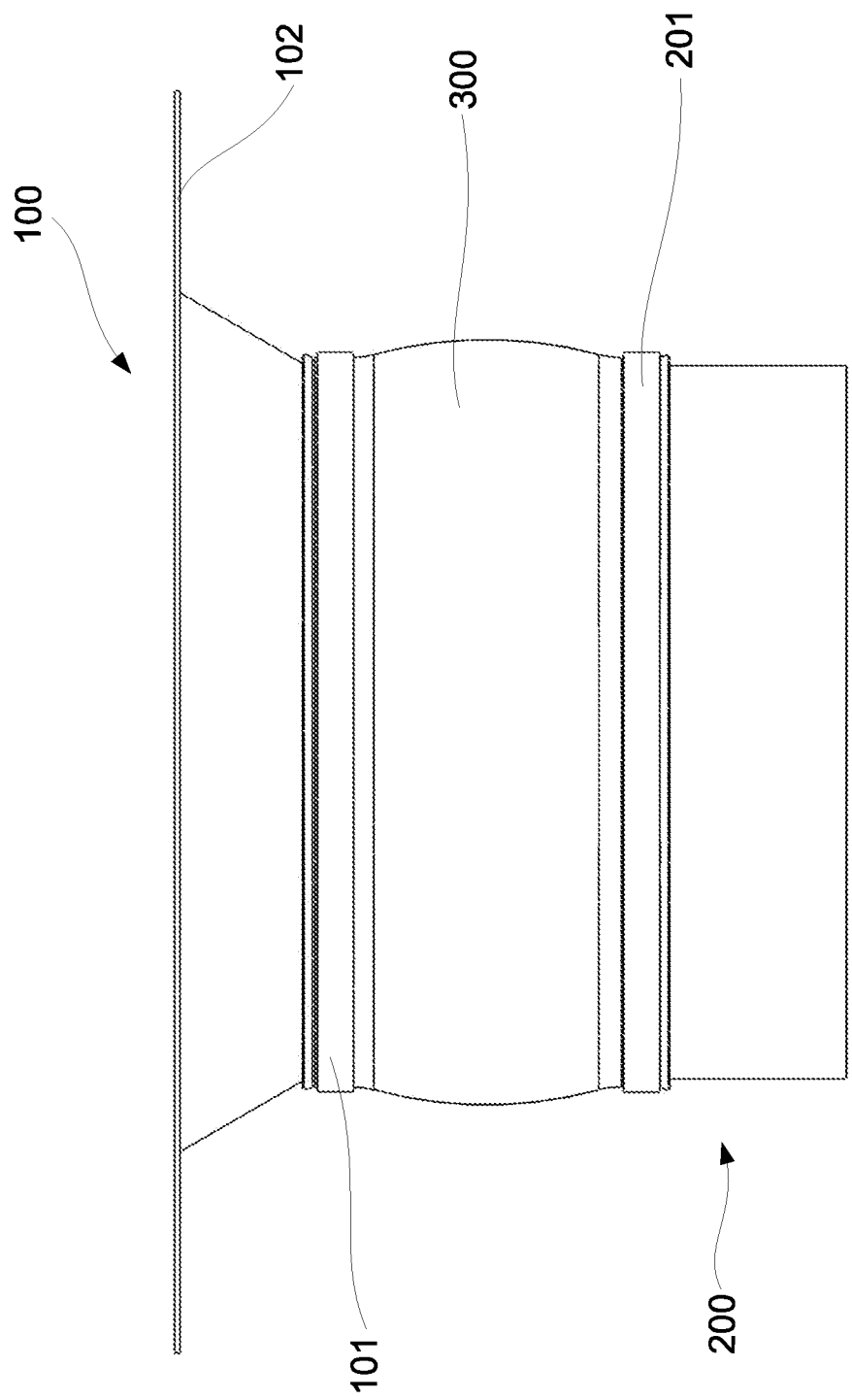
FIG. 1 is a side view of a bellow according to the disclosure mounted to the end of two opposing pipes.
Figure 2:
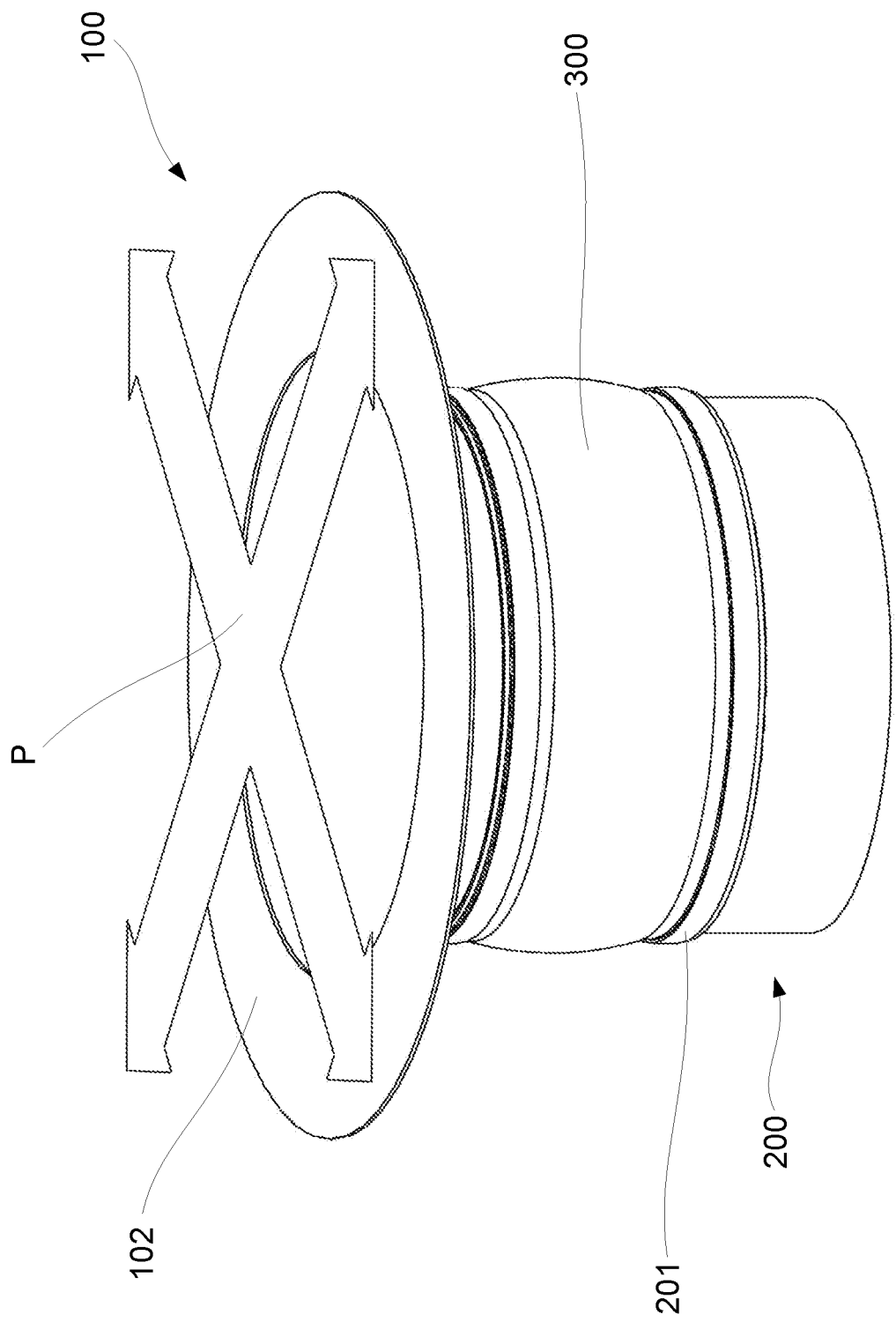
FIG. 2 is a drawing similar to FIG. 2, but in perspective and with arrows indicating directions of movement.

Now referring to FIG. 1, the bellow 300 is illustrated in a side view in an assembled condition between a first cylindrical connector 100 having a connector end 101 (hereinafter also denoted as "first connector flange"), and a second cylindrical connector 200 having a connector end 201 (hereinafter also denoted as "second connector flange"). An upper flange of the first connector 100 is indicated by reference numeral 102. FIG. 2 is a view similar to FIG. 1 but in a perspective view, where the arrows P indicates the direction of movements the first connector 100 is subjected to, i.e. in all directions in the plane of the upper flange 102. However, the first connector 100 may also be subjected to forces acting at an angle different from the plane of the upper flange 102.

FIGS. 3A and 3B illustrates a first embodiment of the bellow 300, a double-layered bellow comprising separate bellow sections. The double-layered bellow 300 comprises a first (inner) bellow section 300' and a second (outer) bellow section 300". The first bellow section 300 comprises a first zipper part 305' with zipper teeth (not shown), arranged at a first end of the first bellow section 300', and a second zipper part 305" with mating zipper teeth (not shown), arranged at a second end of the first bellow section 300'. In a similar manner, the second bellow section 300" comprises a first zipper part 305' and a second zipper part 305". The bellow sections are made of a flexible material, here illustrated in a condition ready to be assembled to flanges of respective connectors, in a cylindrical cocentric configuration.

FIGS. 4A and 4B, the bellow has been omitted, illustrating the first connector 100 having a first connector end 101 (first connector flange), and the second connector 200 having a second connector end 201 (second connector flange), ready to be provided with a bellow in accordance with the disclosure.

Figure 5B:
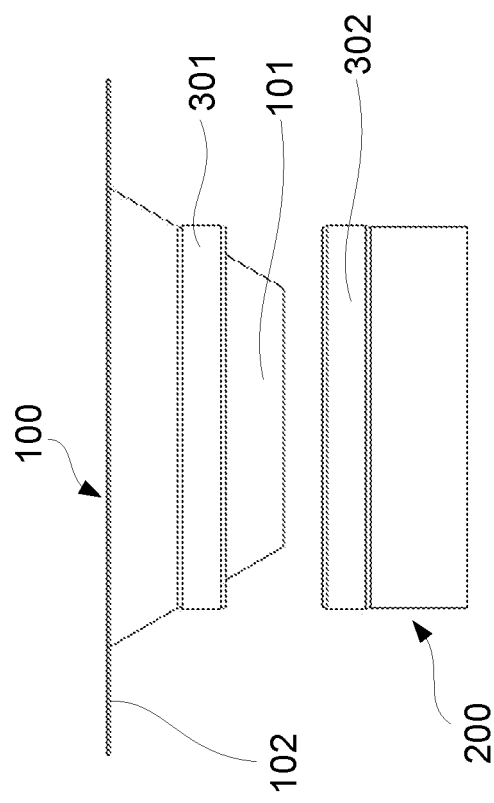
FIGS. 5A and 5B are drawings similar to FIGS. 4A and 4B, respectively, but with a seal strip.
Figure 5A:
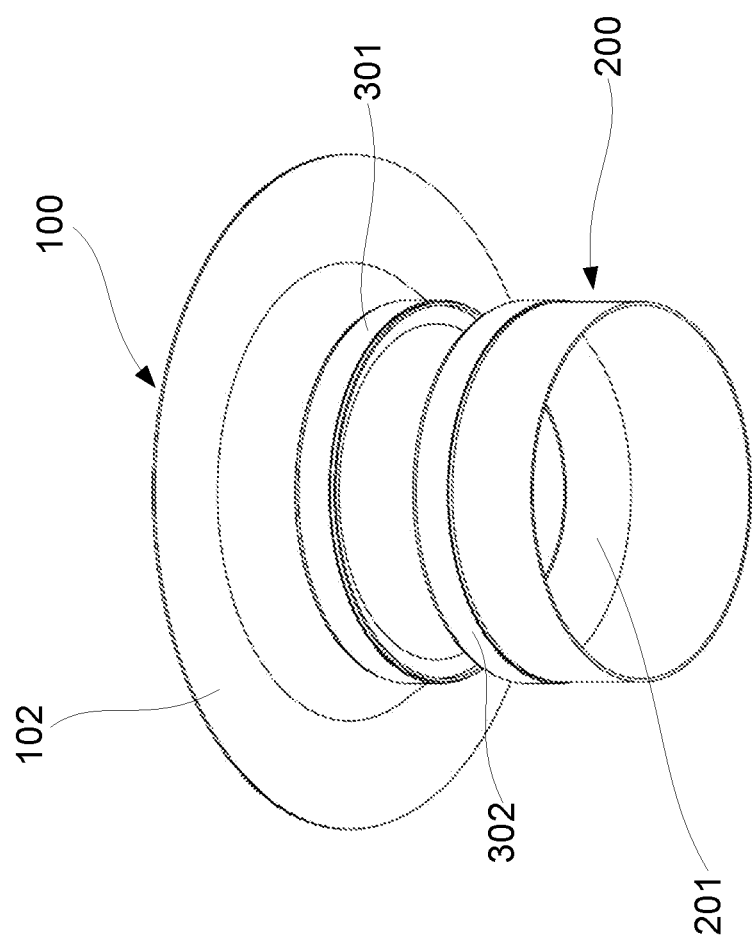

FIGS. 5A and 5B are drawings similar to FIGS. 4A and 4B, but where a peripherical or annular first connector sealing 301 and peripherical or annular second connector sealing 302 have been applied to the first and second connector flanges 100 and 200, respectively. The first and second connector sealings 301 and 302 are optional, but may serve as a seal in applications where dust or fluid must be prevented from entering the interior of the bellow, or vice versa.

FIGS. 6A-6D illustrate assembly of a second embodiment of the bellow 300 according to the disclosure—a single layered bellow 300 including the optional first and second connector sealings 301 and 302, in a first step of assembly. FIG. 6A illustrates a first and second connector 100 and 200 in perspective, where a single-layered bellow 300 is folded halfway around the first and second connector sealing 301 and 302 and the space therebetween. FIG. 6B is a side view of FIG. 6A, whereas FIG. 6C is a cross-section through the line A-A in FIG. 6B. FIG. 6D shows the details of the first zipper part 305', attached to the first end of the bellow 300, having a zipper support 307 attached or adhered to the inner surface of the bellow 300.

FIGS. 7A-7D are drawings similar to FIG. 6A-&, but with a third embodiment of the bellow 300. FIG. 7A shows the bellow 300 in perspective in a further step of the assembly process, where the bellow has been wrapped substantially completely around the first and second connector sealing applied around the first and second connector flanges 101 and 201, respectively, and around the first and second connector sealings 301 and 302, and the space therebetween. FIG. 7B is a side view of FIG. 7A, whereas FIG. 7C is a cross-section through line H-H of FIG. 7B. FIG. 7D is a sectional view of the encircled part of FIG. 7C, showing details of the bellow 300 about to be wrapped around the first and second connector flanges 101 and 201 and their respective connector sealings 301 and 302.

The third embodiment illustrated in FIGS. 7A-7D is a double-layered bellow 300 comprising a first (inner) bellow section 300' and a second (outer) bellow section 300", interconnected by a bellow section connection 308. The bellow section connection 308 may simply be formed by moulding a part of the bellow sections near the adjacent ends of the first 300' and second 300" bellow section. The bellow section connection 308 can also be established by gluing. Reference numerals 305' and 305" refers to the mating zipper parts of the respective bellow sections.

FIGS. 8A and 8B are perspective and side views, respectively, of a bellow 300 in a final stage of an assembly process. Here, the first and second zipper parts 305' and 305" have been almost completely interconnected by zipper slider 306. The zipper slider pull tab has been omitted. A second clamp 304, e.g. a traditional hose clamp, has been applied around the second connector flange 201 (lower part of bellow 300) and hence around the (optional) second connector sealing 302 and the internally located second connector flange 201. It should be noted that the illustration of FIGS. 8A and 8B is applicable to a single-layered bellow as well as multi-layered bellows.

FIGS. 9A to 9D show a fully assembled bellow according to the disclosure, where FIG. 9A is an elevational view, FIG. 9B is a side view, FIG. 9C is a cross-section through line F-F of FIG. 9B, and FIG. 9D is a more detailed sectional view of the encircled part of FIG. 9C. Here the zipper 305 has been fully closed with the zipper slider 306 parked at the end of the zipper 305, thus arranging the bellow 300 tight around the first and second connector flange 101 and 201, and around the first and second connector sealing 301 and 302 arranged therebetween. A first clamp 303 is applied around the first connector flange 101 (upper part of bellow 300) and hence around the (optional) first connector sealing 301.

FIG. 9D shows a more detailed cross-section of the zipper region of FIG. 9C. The first and second bellow section 300' and 300" are interposed between the second clamp 304 and second connector sealing 302, wrapped around second connector flange 201.

Figure 10:
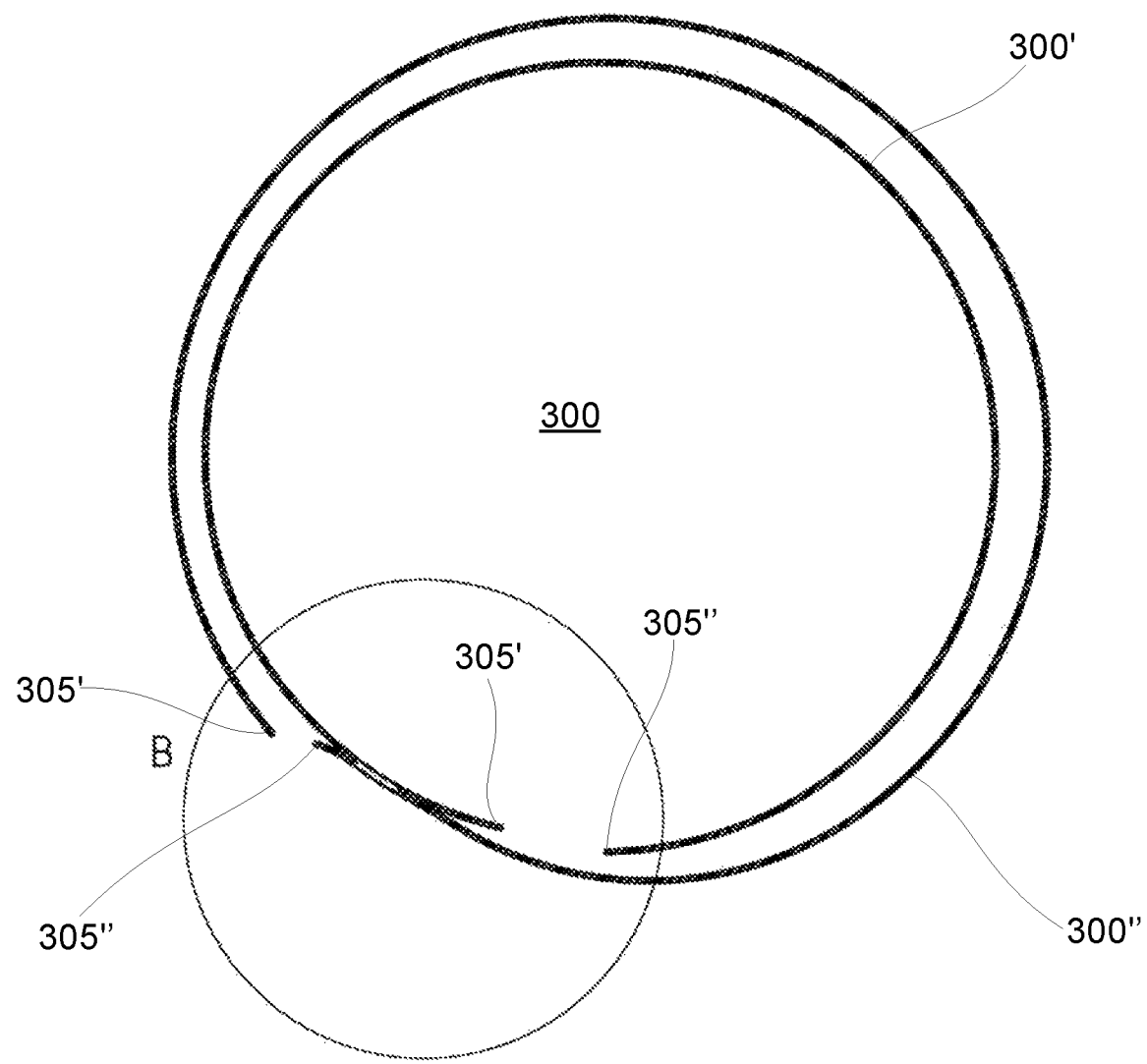
FIG. 10 is a cross-section through an embodiment of the bellow in an open position.
Figure 11:
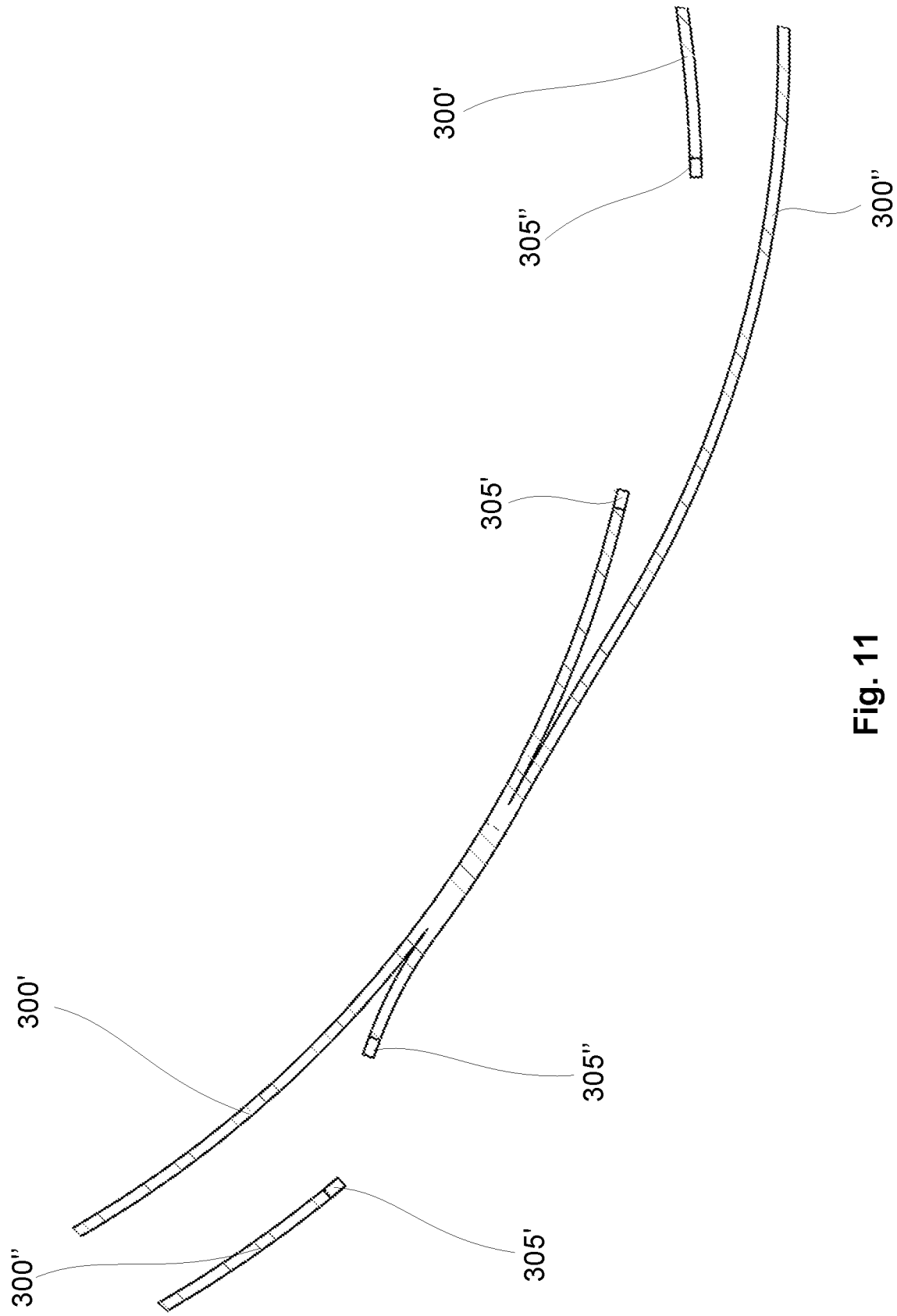
FIG. 11 is a detailed cross-section of the encircled area B in FIG. 10.

FIG. 10 is a cross-section through a double-layered bellow 300 consisting of an interconnected first (inner) bellow section 300' and second (outer) bellow section 300". A similar configuration is shown in FIG. 7D. FIG. 11 is a sectional view of the encircled part B of FIG. 10. Reference is made to the description above of FIG. 7D.

While the disclosed bellow has been illustrated with a convex shape (FIGS. 1 and 2), and with a straight cylindrical shape (FIGS. 3A, 3B and 6-11), the inventive scope of the disclosed embodiments is not limited to these geometries. The bellow may also be provided with a frustoconical shape, e.g. in cases where the opposite connector ends exhibit different diameters. A particularly preferred bellow geometry is convex in applications where the bellow is subjected to forces in the longitudinal direction of the connectors and bellow. In this case the zipper will be subjected to far less strain than with a bellow having a straight cylindrical geometry.

In a preferred embodiment, the bellow is made of an industry standard elastomeric and/or polymeric material. Bellows of this type are particularly suitable in cases where fluid or dust proof assembly is necessary. However, it is also conceivable to use bellows of other materials, such as textile, where requirement to fluid or dustproofing is lower. In general, the bellow material must be able to accommodate varying relative translation and vibration between the connector ends, and materials are selected for flexibility and durability.

The zippers tend to have one 'flat side', where on the other side the main body of the zipper protrudes somewhat from the mounting surface. By utilizing a connector sealing with a thickness that matches the thickness of the zipper itself, and attaching said zipper with the protruding body pointing into the thickness of the connector sealing, the zipper and material can be made to be approximately flush with respect to each other. This accommodates the sealing, by evening out differences in thickness. The additional soft sealing layer also aids in this process.

The zipper quality vary with the field of use. In cases where requirements to fluidproofing or dustproofing is low, low cost zippers may be used. On the other hand, where requirements to ability to withstand strain and intrusion of dust or fluid are high, zippers with higher quality may be required, e.g. diver's wet-suit quality. In the latter case, the quality requirements may be facilitated by providing a double-layered or even multi-layered bellows.

As is apparent from the description above, the disclosed embodiments prescribe at least a single-layered bellow with one zipper, but multiple-layered bellows, interconnected or not, can be used according to the intended field of use. It should be mentioned that the space(s) between adjacent bellow sections in multi-layered bellows can be filled with a sealant, such as grease, to enhance fluidproofing or dustproofing.

REFERENCE NUMBERS

100 First connector
101 First connector end
102 Upper flange
200 Second connector
201 Second connector end
300 Bellow
301 First connector sealing
302 Second connector sealing
300' First (inner) bellow section
300" Second (outer) bellow section
303 First clamp
304 Second clamp
305 Zipper
305' First zipper part
305" Second zipper part
306 Zipper slider
307 Zipper support
308 Bellow section connection

The invention claimed is:

1. A bellow connection for protecting space between a first connector end of a first connector and a second connector end of a second connector in a coupling, the first and second connectors being subjected to relative translation and vibration during use, said bellow connection comprising:
a bellow formed from a flexible material that is at least partially dustproof or fluidproof and being arranged to be attached to the first connector end by a first clamp and to the second connector end by a second clamp, the bellow being split and comprising at least one sheet defining a plane when flat provided with a zipper comprising a zipper slider and first and second cooperative zipper parts attached to opposite ends of the sheet, the zipper being arranged to close or open the bellow when wrapped around said first and second connector ends;
a first connector annular sealing formed from a flexible material arranged to be applied on said first end and a second connector annular sealing formed from a flexible material is arranged to be applied on said second connector end, the first and second connector annular sealings being positioned underneath the bellow when the bellow is wrapped around said first connector end and second connector end, wherein
the bellow sheet exhibits excessive material providing a bellow length measured along a longitudinal axis of the bellow when assembled, the bellow length being longer than a distance between said first and second connector ends, thereby providing first and second regions of the bellow ends without the zipper,
the first region of the bellows ends overlying the first connector annular sealing with the first clamp being positioned to surround the first connector annular sealing; and
the second region of the bellows ends overlying the second connector annular sealing with the second clamp being positioned to surround the second connector annular sealing.

2. The bellow connection of claim 1, wherein the bellow section connection is a moulded connection.

3. The bellow connection of claim 1, wherein the bellow section connection is a glued connection.

4. The bellow connection of claim 1, wherein the bellow has a convex surface configuration when wrapped and secured around the first and second connector ends.

5. The bellow connection of claim 1, wherein the bellow has a convex surface configuration when wrapped and secured around the first and second connector ends.

6. The bellow connection of claim 1, wherein the bellow has a substantially cylindrical surface configuration when wrapped and secured around the first and second connector ends.

7. The bellow connection of claim 1, wherein the bellow has a frustoconical surface configuration when wrapped and secured around the first and second connector ends.

8. The bellow connection of claim 1, comprising an applied sealant located in an interstice between the first and second bellow sections.

9. The bellow connection of claim 8, wherein the sealant is a viscous sealant.

10. The bellow connection of claim 8, wherein the sealant is grease.

11. The bellow connection of claim 1, wherein the bellow sheet is made of a material selected from the group consisting of a polymer, elastomer and textile.

12. A bellow connection for protecting space between a first connector end of a first connector and a second connector end of a second connector in a coupling, the first and second connectors being subjected to relative translation and vibration during use, said bellow connection comprising:
a split bellow formed from a flexible material that is at least partially dustproof or fluidproof and being arranged to be attached to the first connector end by a first clamp and to the second connector end by a second clamp;
a zipper having zipper parts attached to opposite ends of the split bellow, the zipper being arranged to close or open the split bellow when wrapped around said first and second connector ends;
a first connector annular sealing formed from a flexible material arranged to be applied on said first end and a second connector annular sealing formed from a flexible material is arranged to be applied on said second connector end, the first and second connector annular sealings being positioned underneath the split bellow when the split bellow is wrapped around said first connector end and second connector end;

the split bellow having first and second longitudinal end regions without the zipper parts and having abutting edges that do not overlap, the first longitudinal end region overlying the first connector annular sealing with the first clamp being positioned to surround the first connector annular sealing; and the second longitudinal end region overlying the second connector annular sealing with the second clamp being positioned to surround the second connector annular sealing.

13. A bellow connection for protecting space between a first connector end of a first connector and a second connector end of a second connector in a coupling, the first and second connectors being subjected to relative translation and vibration during use, said bellow connection comprising:

a split bellow formed from a flexible material that is at least partially dustproof or fluidproof and being arranged to be attached to the first connector end by a first clamp and to the second connector end by a second clamp;

a zipper having zipper parts attached to opposite ends of the split bellow, the zipper being arranged to close or open the split bellow when wrapped around said first and second connector ends;

a first connector annular sealing formed from a flexible material arranged to be applied on said first end and a second connector annular sealing formed from a flexible material is arranged to be applied on said second connector end, the first and second connector annular sealings being positioned underneath the split bellow when the split bellow is wrapped around said first connector end and second connector end; and first and second zipper supports located beneath respective first and second longitudinal end regions of the split bellows.

14. The bellows connection of claim 13, further comprising:

the first and second longitudinal end regions being without the zipper parts and having abutting edges that do not overlap;

the first longitudinal end region overlying the first connector annular sealing with the first clamp being positioned to surround the first connector annular sealing; and the second longitudinal end region overlying the second connector annular sealing with the second clamp being positioned to surround the second connector annular sealing.

\* \* \* \* \*